No. 843,484. PATENTED FEB. 5, 1907.
J. NELSON.
COTTON CHOPPING AND SCRAPING MACHINE.
APPLICATION FILED NOV. 11, 1905.
2 SHEETS—SHEET 1.
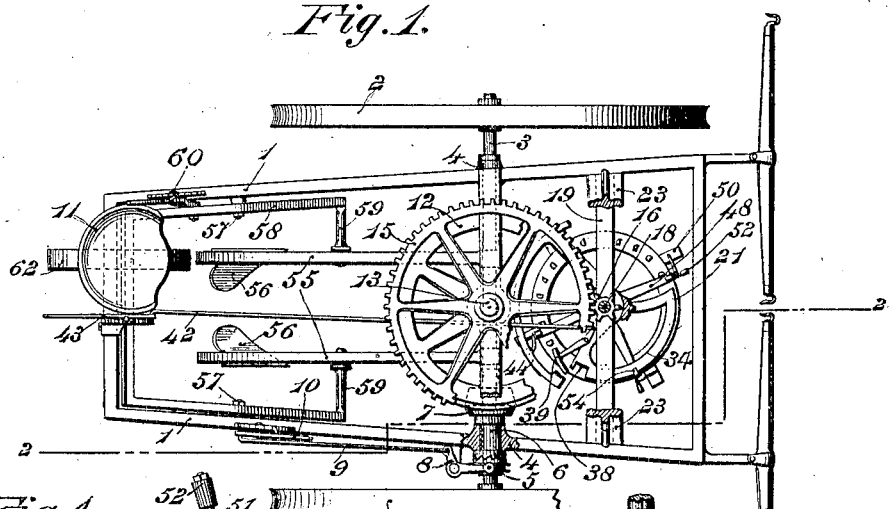
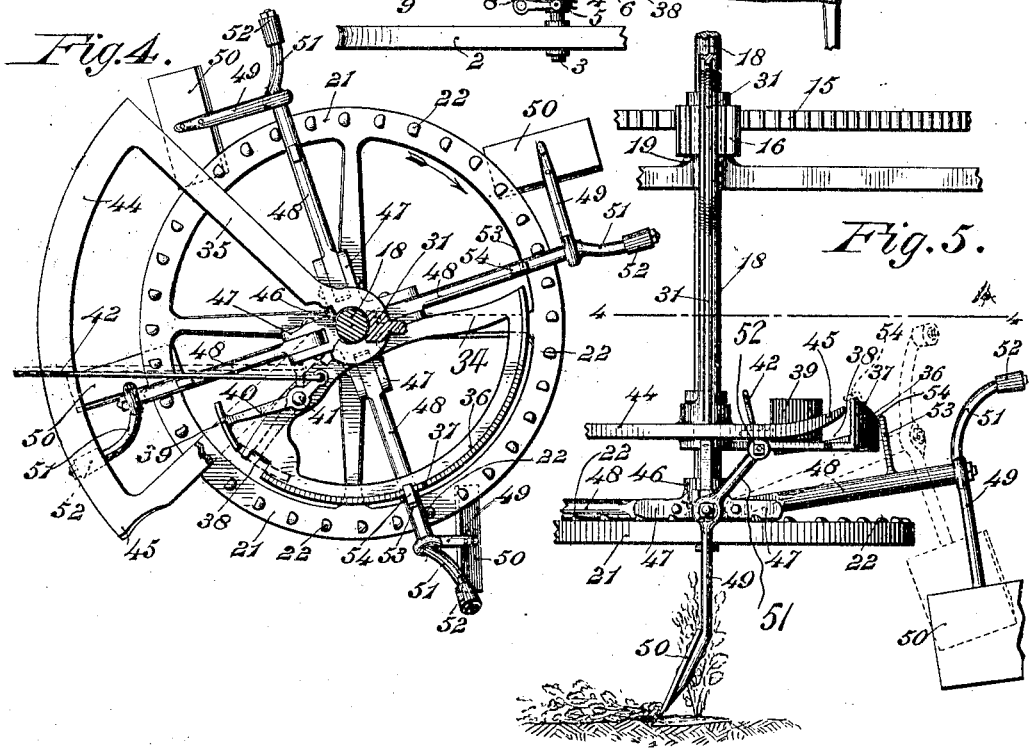
WITNESSES
INVENTOR
James Nelson
By Victor J. Evans.
Attorney No. 843,484. PATENTED FEB. 5, 1907.
J. NELSON.
COTTON CHOPPING AND SCRAPING MACHINE.
APPLICATION FILED NOV. 11, 1905.
2 SHEETS—SHEET 2.
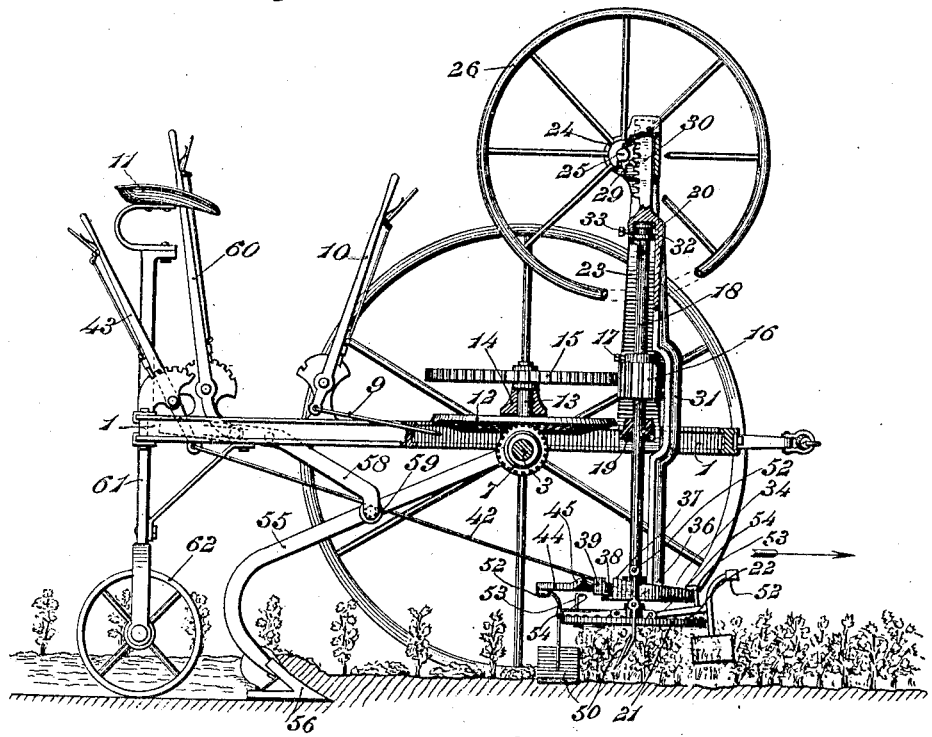
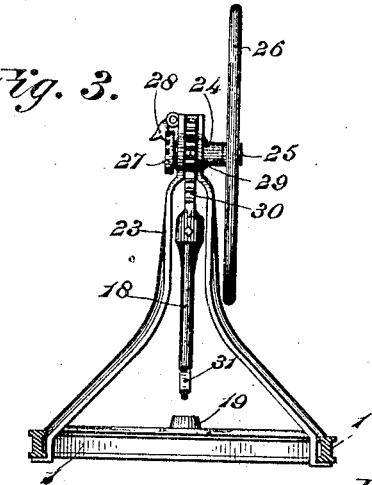
WITNESSES
INVENTOR
James Nelson
By Victor J. Evans
Attorney

UNITED STATES PATENT OFFICE.

JAMES NELSON, OF SILVER CREEK, MISSISSIPPI.

COTTON CHOPPING AND SCRAPING MACHINE.

No. 843,484. Specification of Letters Patent. Patented Feb. 5, 1907.

Application filed November 11, 1905. Serial No. 286,870.

*To all whom it may concern:*

Be it known that I, JAMES NELSON, a citizen of the United States, residing at Silver Creek, in the county of Lawrence and State of Mississippi, have invented new and useful Improvements in Cotton Chopping and Scraping Machines, of which the following is a specification.

This invention relates to cotton chopping or scraping machines of the type embodying chopping members or hoes, and has for its objects to produce a comparatively simple inexpensive device of this character which in practice will efficiently remove from the rows and destroy the surplus plants—one wherein the chopping members will move automatically to active and inactive positions and one in which the movement of the members to active position may be regulated or controlled and the members properly adjusted relative to the ground-surface.

A further object of the invention is to provide a machine of this type wherein the chopping or scraping members will be positively driven from the transporting-wheels—one wherein the members will be brought successively into action at predetermined intervals for properly acting upon the row of plants and one whereby the plants will be cultivated in one operation with the chopping or thinning action.

With these and other objects in view the invention comprises the novel features of construction and combination of parts more fully hereinafter described.

In the accompanying drawings, Figure 1 is a top plan view of a machine embodying the invention. Fig. 2 is a side elevation, partly in vertical section, the section being taken on the line 2 2 of Fig. 1. Fig. 3 is a detail view of the adjusting mechanism. Fig. 4 is a horizontal section taken on the line 4 4 of Fig. 5 and looking downward, the parts being shown on an enlarged scale. Fig. 5 is a detail view, in elevation and on an enlarged scale, of the chopping members and their operating mechanism.

Referring to the drawings, 1 designates the frame of the machine, mounted for transportation on ground-wheels 2, fixed on a rotary shaft or axle 3, extended transversely through the frame 1 and journaled in suitable bearings 4 in the latter, there being disposed for longitudinal movement on the shaft and fixed for rotation therewith a clutch member 5, adapted for movement into and out of engagement with the hub 6 of a bevel-pinion 7, through the medium of a bell-crank lever 8, connected by a link 9 with an operating-lever 10, disposed within convenient reach of the seat 11.

The pinion 7, which is loose upon the shaft, is in engagement with a bevel-gear 12, fixed upon a stub-shaft 13, journaled in a suitable bearing 14 and carrying a horizontal gear 15, in mesh with a pinion 16, fixed by means of a set-screw 17 on a vertical-driven shaft 18, journaled in a suitable bearing 19 and provided at its upper end with a peripheral groove or seat 20, there being fixed upon the lower end of the driven shaft and for rotation therewith a horizontal blade-operating member or wheel 21, having upon its upper face a concentric series or row of relatively spaced engaging portions or teeth 22, which project vertically upward from the face of the wheel.

Attached to and arising vertically from the frame 1 is a substantially V-shaped supporting standard or frame 23, provided at its upper end with a bearing 24, in which is journaled a stub-shaft 25, on which is fixed an operating and balance wheel 26 and a circular rack 27, adapted for engagement by a pawl 28 to fix the shaft against movement, there being also fixed upon said shaft a pinion 29 in mesh with a rack 30, formed at the upper end of a vertically-movable member or arm 31, provided at a point beneath the rack 30 with a socket 32 for the reception of the upper end of shaft 18, which latter is fixed for movement with the arm by means of a set-screw 33, entered through the wall of the socket and into the groove 20. It is to be observed in this connection that while the shaft will move vertically with the arm 31 it may rotate freely independently of the latter, and, further, that the pinion 16 may be adjusted on the shaft 18 to accord with the vertical adjustment of the latter.

Fixedly carried at the lower end of arm 31 is a pair of sector-shaped members or plates 34 35, of which the plate 34 is provided with a marginal vertically-upstanding cam portion or flange 36, the upper edge 37 of which is inclined gradually upward from its front to its rear end, at which latter point there is formed in the plate 34 a radial notch or recess 38, adapted to be bridged and closed by the vertically-disposed portion or arm 39 of a regulating member or lever 40, pivoted between its ends, as at 41, to the plate 34 and having its inner end connected, by means of a connecting rod or element 42, with an operating-lever 43, disposed within reach of the seat 11, while the plate 35, which presents a horizontal segmental track 44, is provided at the forward end of said track with an upwardly and rearwardly curved entrance portion or cam 45 for a purpose which will hereinafter appear.

Loosely journaled upon the lower end of shaft 18 and immediately over the wheel 21 is a rotary head or hub 46, provided with radial bearing arms or ears 47, to which are pivoted, respectively, the inner ends of a plurality of arms or beams 48, adapted to swing independently in a vertical plane and having pivoted on their outer ends the shanks or stems 49 of chopping members or blades 50, adapted to travel over the ground-surface, for chopping and destroying the surplus plants, there being formed at the upper end of each of the stems 49 an upwardly and outwardly curved engaging portion or arm 51, equipped at its outer end with an antifriction bearing-roller 52, while fixed upon each of the beams 48, at a point suitably remote from its outer end, is a vertical uprising engaging member or finger 53, having at its inner end an inturned engaging portion or hook 54, adapted to engage and ride upon the inclined edge 37 of the cam 36, for a purpose which will hereinafter appear.

Loosely hung at their forward ends upon the shaft or axle 3 is a pair of relatively spaced rearwardly-projecting beams 55, carrying at their rear ends cultivating or plowing blades 56, while pivoted adjacent its longitudinal center, as at 57 in the frame 1, is a substantially U-shaped lifting member or frame 58, provided at its forward end with inturned portions or arms 59, journaled to the beams 55, there being connected to the frame 58 an operating-lever 60, suitably mounted within convenient reach on the seat 11.

The seat 11 is fixed upon the upper end of a vertical standard 61, attached to the frame 1 and carrying at its lower end a guide-wheel 62, arranged to travel on the ground-surface and guide the machine, as usual.

In practice as the machine advances over the ground motion is imparted to the stub-shaft 13 through the medium of the pinion 7 and gear 12 and transmitted to the vertical driven shaft 18 by means of the gear 15 and pinion 16 for imparting a rotary movement to the horizontal wheel 21, carried by the latter shaft. As the wheel 21 rotates the hub 46 is moved therewith, owing to engagement of certain of the teeth 22 with the arms or beams 48, thus sweeping the cutting members or blades 50 transversely through the row of plants over which the wheel 21 travels, and during the action of the parts the arms 48 will be successively raised to move the cutting-blades out of action, owing to the hooked ends of the members 53 riding successively upward on the cam-face 37, it being noted that as the members 53 pass off of the rear end of the cam-face the rollers 52 on the cam-arms 51 pass beneath the track 44, thereby holding the blades in active cutting position. As soon as the blades have passed through the row of plants the arms 51 move from beneath the track 44 and the blades 50 swing upon the arms 48 to inactive position and are drawn in this condition over the ground-surface until they again reach and pass beneath the track 44, prior to which they are turned to active position through the medium of the cam 36 and the contact of the arms 51 with the upturned portion 45 of the track, as will be readily understood. The time of passage of the cutting-blades from the cam 36 to the track may be varied by means of the controlling member 40, which when moved to cover the opening 38, as indicated by dotted lines in Fig. 4, increases the interval of the time during which the blades will be held in elevated position by the cam member before permitting them to drop for passage beneath the track 44. The cutting-blades will be adjusted relative to the ground-surfaces by manipulating the wheel 26 to raise or lower the member 31 and shaft 18 through medium of the pinion 29 and rack 30, as is obvious, while the depth of entrance of the cultivating blades or plows 56 into the ground may be controlled through the medium of lever 60 and the pivoted frame 58. It will be observed that as the machine travels over the ground the blades 50 are moved successively into action for thinning the plants, while the plows 56 serve to effect cultivation of the latter.

From the foregoing it is apparent that I produce a simple device admirably adapted for the attainment of the ends in view, it being understood that in attaining these ends minor changes in the details herein set forth may be resorted to without departing from the spirit of the invention.

Having thus fully described my invention, what I claim as new, and desire to secure by Letters Patent, is—

1. In a device of the class described, a frame, transporting-wheels therefor, a plurality of scraping members, means for automatically moving said members independently and successively into and out of action, and means for varying at will the time of movement of the individual members into action.

2. In a device of the class described, a frame, transporting-wheels therefor, a rotary shaft sustained in the frame, a plurality of pivoted scraper members adapted to swing from active to inactive position, means on the shaft for actuating the members, and means for automatically swinging said members independently and successively to active position and maintaining them in such position at determined intervals.

3. In a device of the class described, a frame, transporting-wheels therefor, a rotary shaft sustained in the frame, a plurality of pivoted scraper members, means on the shaft for actuating the members, a fixed track beneath which the members pass and by which they are maintained in active cutting position, said members being adapted to move to inactive position upon passing from beneath the track, and means for automatically turning the members to active position prior to their passage beneath the track.

4. In a device of the class described, a frame, transporting-wheels therefor, a rotary shaft sustained in the frame, a plurality of pivoted scraper members adapted to swing from active to inactive position, means for actuating the members, a fixed track beneath which the members pass and by which they are maintained in active cutting position, and means for automatically elevating and turning the members prior to passage beneath the track.

5. In a device of the class described, a frame, transporting-wheels therefor, a rotary shaft sustained in the frame, a plurality of pivoted scraper members operatively connected with and for actuation by the shaft, said members being provided with projecting engaging arms and adapted to swing from active to inactive position, a track beneath which the arms ride for holding the members in active cutting position, and means for automatically turning the members to such position prior to their passage beneath the track.

6. In a device of the class described, a frame, transporting-wheels therefor, a rotary shaft sustained in the frame, a scraper-blade operatively connected with and for actuation by the shaft, said blade being attached to swing from active to inactive position and having a projecting bearing-arm, a fixed track beneath which the arm rides for maintaining the blade in active cutting position, and means for automatically turning the blade to active position prior to its entrance beneath the track.

7. In a device of the class described, a frame, transporting means therefor, a rotary shaft sustained in the frame, a plurality of scraping-blades operatively connected with and for actuation by the shaft, said blades being pivoted to swing from active to inactive position and each having a projecting bearing-arm, a track beneath which the blades successively pass and with which the arms contact for holding the blades in active cutting position, means for automatically turning the blades to such position prior to their passage beneath the tracks, and means for controlling the time of entrance of the blades beneath the tracks.

In testimony whereof I affix my signature in presence of two witnesses.

JAMES NELSON.

Witnesses:
DALE GRIFFITH,
J. K. POLK.